C. B. KOON.
VEHICLE SPRING.

No. 180,720. Patented Aug. 8, 1876.

Witnesses
W. B. Masson
Edmund Masson

Inventor
Charles B. Koon
By atty A. B. Stoughton

UNITED STATES PATENT OFFICE.

CHARLES B. KOON, OF AUBURN, NEW YORK.

IMPROVEMENT IN VEHICLE-SPRINGS.

Specification forming part of Letters Patent No. 180,720, dated August 8, 1876; application filed July 24, 1875.

*To all whom it may concern:*

Be it known that I, CHARLES B. KOON, of the city of Auburn, in the county of Cayuga and State of New York, have invented certain new and useful Improvements in Leaf Carriage-Springs for Vehicles; and I do hereby declare that the following is a full, clear, and exact description of the same, reference being had to the accompanying drawings, making a part of this specification, in which—

Figure 1:
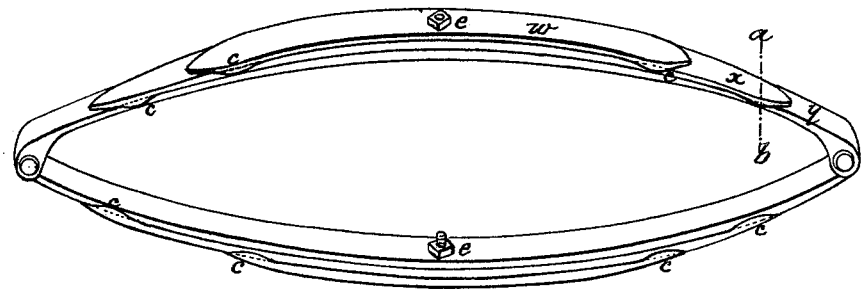
Figure 2:
Figure 3:
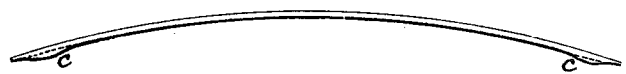

Figure 1 represents a perspective view of a vehicle-spring composed of the two main leaves or heads and four of my improved leaves. Fig. 2 represents a transverse section of the spring on the line $a\,b$ of Fig. 1. Fig. 3 represents a side view of one of the leaves of the spring, showing the elongated fins near the ends thereof.

I am aware that many devices have been contrived for the ordinary bead and slot cut in springs to hold them together, as this slot weakens the springs, among which flanges or shoulders have been welded or formed on the side of either the upper or lower leaf of the spring, or even on each leaf; but such devices have not come into general use on account of the expense or difficulty attending their application; and the object of my invention is to hold the several leaves of the spring in line with each other by means of an elongated fin left on or formed homogeneously with and upon each side of each leaf, (except the main leaves or heads,) near each end thereof, during the operation of rolling or swaging the spring into shape without adding to the cost of the spring. For this purpose the width of the projecting rim of one of the forming-rollers used to press and shape the spring is slightly less than the width of the spring where the fins are to be produced, while the corresponding cavity in the other roller is slightly larger, thus forcing the metal on each side of the projecting rim, and forming the desired elongated fin at the right place upon the sides of the spring without any addition of labor or material.

In the drawings, the main leaves are shown at $y$, and are formed in the ordinary manner. On the outside of them the leaves $x$ are placed and kept in parallel position by the elongated fins $c$, formed, as above described, upon the sides and near to their extremities. Similar leaves, $w$, having also elongated fins $c$, are laid upon the leaves $x$, and the several leaves $w\,x\,y$ are retained in place by the bolts E passing through their center.

Having thus fully described my invention, I will state that I am aware that springs have been formed with flanges to inclose all the leaves the whole length, and that short flanges or shoulders have been welded or formed on the side of the leaves to retain them in position, and I do not claim these devices; but

I claim—

The leaves $w\,x$ of carriage-springs, provided with an elongated fin, $c$, upon each edge, homogeneous with and near the ends thereof, substantially as and for the purpose described.

CHARLES B. KOON.

Witnesses:
F. G. DAY,
D. WRIGHT.